United States Patent
Ishii et al.

(10) Patent No.: US 10,771,646 B2
(45) Date of Patent: Sep. 8, 2020

(54) READING DEVICE, IMAGE FORMING APPARATUS, REFERENCE PATTERN READING METHOD, AND STORAGE MEDIUM STORING PROGRAM CODE

(71) Applicants: Tatsuya Ishii, Kanagawa (JP); Yoshiko Niki, Kanagawa (JP); Satoshi Iwanami, Kanagawa (JP); Osamu Inage, Kanagawa (JP); Shinichiroh Wada, Kanagawa (JP); Masamoto Nakazawa, Kanagawa (JP); Ryohma Ikemoto, Kanagawa (JP); Daisuke Nikaku, Kanagawa (JP)

(72) Inventors: Tatsuya Ishii, Kanagawa (JP); Yoshiko Niki, Kanagawa (JP); Satoshi Iwanami, Kanagawa (JP); Osamu Inage, Kanagawa (JP); Shinichiroh Wada, Kanagawa (JP); Masamoto Nakazawa, Kanagawa (JP); Ryohma Ikemoto, Kanagawa (JP); Daisuke Nikaku, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/155,781

(22) Filed: Oct. 9, 2018

(65) Prior Publication Data

US 2019/0166274 A1    May 30, 2019

(30) Foreign Application Priority Data

Nov. 30, 2017  (JP) ................................. 2017-231295
Jul. 23, 2018   (JP) ................................. 2018-137943

(51) Int. Cl.
H04N 1/04    (2006.01)
H04N 1/00    (2006.01)
(Continued)

(52) U.S. Cl.
CPC ..... *H04N 1/00761* (2013.01); *H04N 1/00034* (2013.01); *H04N 1/00045* (2013.01);
(Continued)

(58) Field of Classification Search
CPC ........... H04N 1/00761; H04N 1/00702; H04N 1/00774; H04N 1/00034; H04N 1/00045;
(Continued)

(56) References Cited

U.S. PATENT DOCUMENTS

| | | | |
|---|---|---|---|
| 4,370,641 A | 1/1983 | Kantor et al. | |
| 4,605,970 A | 8/1986 | Hawkins | |
| 5,357,351 A * | 10/1994 | Nakajima | ............... H04N 1/031 358/482 |
| 6,263,117 B1 * | 7/2001 | Lee | ........................ H04N 1/047 382/254 |

(Continued)

FOREIGN PATENT DOCUMENTS

| | | |
|---|---|---|
| CN | 101090440 A | 12/2007 |
| JP | 2007-318347 | 12/2007 |
| JP | 2015-201843 | 11/2015 |

OTHER PUBLICATIONS

European Search Report; Application 18199868.3-1209; dated Apr. 3, 2019.
(Continued)

*Primary Examiner* — Cheukfan Lee
(74) *Attorney, Agent, or Firm* — Duft & Bornsen, PC

(57) ABSTRACT

A reading device includes a position reference member and a reader. The position reference member has a reference pattern that includes a line extending in a prescribed direction. The position reference member is configured to relatively move in a direction orthogonal to the prescribed direction. The reader includes a plurality of sensor chips, each of the sensor chips including a plurality of pixels. The reference pattern corresponds to each of the sensor chips of the reader.

19 Claims, 11 Drawing Sheets

(51) Int. Cl.
*H04N 1/047* (2006.01)
*H04N 1/053* (2006.01)

(52) U.S. Cl.
CPC ..... *H04N 1/00063* (2013.01); *H04N 1/00702* (2013.01); *H04N 1/00774* (2013.01); *H04N 1/00819* (2013.01); *H04N 1/0473* (2013.01); *H04N 1/053* (2013.01); *H04N 2201/0006* (2013.01); *H04N 2201/044* (2013.01); *H04N 2201/0448* (2013.01); *H04N 2201/04715* (2013.01)

(58) Field of Classification Search
CPC ........... H04N 1/00063; H04N 1/00819; H04N 1/0473; H04N 1/053; H04N 2201/0006; H04N 2201/044; H04N 2201/0448; H04N 2201/04715
USPC .............. 358/1.12, 3.26, 482, 483, 512–514; 250/208.1, 216
See application file for complete search history.

(56) References Cited

U.S. PATENT DOCUMENTS

| | | | |
|---|---|---|---|
| 8,534,792 B2* | 9/2013 | Geurts | B41J 2/2132 347/19 |
| 2002/0097293 A1 | 7/2002 | Castelli et al. | |
| 2004/0170314 A1 | 9/2004 | Harris et al. | |
| 2007/0291326 A1 | 12/2007 | Morita et al. | |
| 2010/0002273 A1* | 1/2010 | Schmidt | H04N 1/03 358/475 |
| 2012/0092731 A1 | 4/2012 | Nishida et al. | |
| 2018/0020108 A1 | 1/2018 | Nakayama et al. | |
| 2018/0149861 A1* | 5/2018 | Ouchi | G02B 27/0025 |
| 2019/0163112 A1* | 5/2019 | Nikaku | G03G 15/6567 |
| 2019/0166271 A1* | 5/2019 | Yamazaki | H04N 1/00702 |
| 2019/0166275 A1* | 5/2019 | Ishii | H04N 1/00761 |
| 2019/0238702 A1* | 8/2019 | Ikemoto | H04N 1/00779 |
| 2020/0106907 A1* | 4/2020 | Hirano | H04N 1/00809 |

OTHER PUBLICATIONS

Chinese Office Action; Application CN201811100562.8; dated Dec. 16, 2019.

* cited by examiner

US 10,771,646 B2

READING DEVICE, IMAGE FORMING APPARATUS, REFERENCE PATTERN READING METHOD, AND STORAGE MEDIUM STORING PROGRAM CODE

CROSS-REFERENCE TO RELATED APPLICATION

This patent application is based on and claims priority pursuant to 35 U.S.C. § 119(a) to Japanese Patent Application No. 2017-231295, filed on Nov. 30, 2017 and Japanese Patent Application No. 2018-137943, filed on Jul. 23, 2018, in the Japan Patent Office, the entire disclosures of which are hereby incorporated by reference herein.

BACKGROUND

Technical Field

Embodiments of the present disclosure relate to a reading device, an image forming apparatus incorporating the reading device, a reference pattern reading method, and a storage medium storing program code for causing a computer to execute the method.

Background Art

The technology has been known that reads the outer edge position and the processing position of a conveyed object using a reader such as a contact image sensor (CIS) mounted in a reading device so as to correct a position to which the conveyed object has been conveyed and the processing position of the conveyed object.

Further, the technology is also known that detects displacement of the installation position of the reader by reading a proof sheet.

SUMMARY

In one aspect of this disclosure, there is provided an improved reading device including a position reference member and a reader. The position reference member has a reference pattern that includes a line extending in a prescribed direction. The position reference member is configured to relatively move in a direction orthogonal to the prescribed direction. The reader includes a plurality of sensor chips arranged in the prescribed direction, each of the sensor chips including a plurality of pixels. The reference pattern corresponds to each of the sensor chips of the reader.

In another aspect of this disclosure, there is provided an improved image forming apparatus including the above-described reading device; a print engine; and circuitry. The circuitry is configured to relatively move a recording medium, onto which an image is to be formed by the print engine, in the direction orthogonal to the prescribed direction in which the line of the reference pattern extends; and detect an outer shape of the recording medium and a position of an image pattern on the recording medium based on the image read by the reader; and correct a detection result with reference to a correction value obtained by the reading device.

In still another aspect of this disclosure, there is provided an improved reference pattern reading method including reading, by a reader, a line extending in a prescribed direction in a reference pattern, from a position reference member that relatively moves in a direction orthogonal to the prescribed direction, the position reference member including the reference pattern that corresponds to each of sensor chips disposed in the prescribed direction on the reader, each of the sensor chips including a plurality of pixels; and reading another line extending in a direction orthogonal to the prescribed direction in the reference pattern, from the position reference member stopped at a position at which the line extending in the prescribed direction falls within a reading range of the reader.

In yet another aspect of this disclosure, there is provided an improved non-transitory recording medium storing a program for causing a computer to execute the above-described method

BRIEF DESCRIPTION OF THE DRAWINGS

The aforementioned and other aspects, features, and advantages of the present disclosure will be better understood by reference to the following detailed description when considered in connection with the accompanying drawings, wherein.

Figure 1:
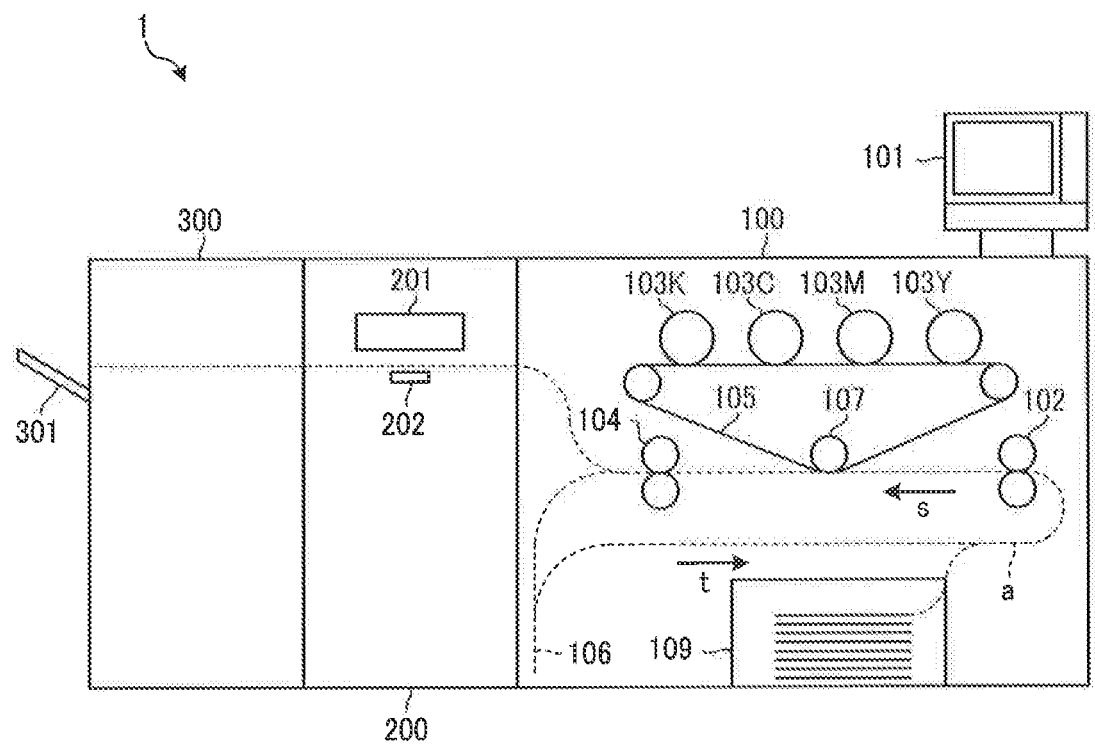
FIG. 1 is a schematic illustration of a hardware configuration of a printing system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results. As used herein, the singular forms "a", "an", and "the" are intended to include the plural forms as well, unless the context clearly indicates otherwise.

Although the embodiments are described with technical limitations with reference to the attached drawings, such description is not intended to limit the scope of the disclosure and all of the components or elements described in the embodiments of this disclosure are not necessarily indispensable.

Embodiments of the present disclosure are described in detail with reference to the drawings. Like reference numerals designate identical or corresponding components throughout the several views and a description of same is omitted.

With initially reference with the figures, a description is provided below of embodiments of a reading device, an image forming apparatus incorporating the reading device, a reference pattern reading method, and program.

In the following, the cases where the reading device and the image forming apparatus are applied to a printing system provided with a printing device such as a commercial printing machine (production printing machine) that prints a large number of sheets continuously in a short period of time are described. However, no limitation is intended therein.

FIG. 1 is a schematic illustration of a hardware configuration of a printing system 1 according to an embodiment of the present disclosure. As illustrated in FIG. 1, the printing system 1 as an image forming apparatus includes a printing device 100, a medium position detector 200 (an example of a position detector), and a stacker 300.

The printing device 100 includes an operation panel 101, tandem type electrophotographic image forming units 103Y, 103M, 103C, and 103K, a transfer belt 105, a secondary transfer roller 107, a sheet feeder 109, a pair of conveying rollers 102, a fixing roller 104, and a sheet reverse path 106.

The operation panel 101 is an operation display unit that enables a user to input various operations to the printing device 100 and the medium position detector 200 and displays various screens.

In the printing device 100, a toner image is formed on each of the image forming units 103Y, 103M, 103C, and 103K and the formed toner image is transferred onto the transfer belt 105 by an image forming process (a charging process, an exposing process, a developing process, a transfer process, and a cleaning process).

In the present embodiment, a yellow toner image is formed on the image forming unit 103Y, a magenta toner image is formed on the image forming unit 103M, a cyan toner image is formed on the image forming unit 103C, and a black toner image is formed on the image forming unit 103K. However, no limitation is intended thereby.

The transfer belt 105 conveys the toner image (full-color toner image) in which the toner images of the image forming units 103Y, 103M, 103C, and 103K are transferred to be superimposed on each other, to the secondary transfer position of the secondary transfer roller 107.

In the present embodiment, a yellow toner image is first transferred to the transfer belt 105, and a magenta toner image, a cyan toner image, and a black toner image are sequentially superimposed one atop another on the transfer belt 105 while being transferred from the image forming units 103Y, 103M, 103C, and 103K as the transfer belt 105 rotates. However, no limitation is intended thereby.

The sheet feeder 109 accommodates a plurality of recording media to be processed (conveyed objects) in a superposed manner, and feeds a recording medium. Examples of the recording medium include recording paper (transfer paper). However, the recording medium is not limited to this, and examples of the recording medium may include media capable of recording images such as coated paper, thick paper, overhead projector (OHP) sheets, plastic films, and copper foil.

In the present embodiment, the recording medium on which an image is to be formed is the object to be processed (conveyed object). However, no limitation is indicated thereby. Alternatively, for example, a sheet that is not a target on which an image is to be formed such as pregreg may be an object to be processed (conveyed object).

The pair of conveying rollers 102 conveys the recording medium fed by the sheet feeder 109 in the direction of arrow s on the conveying path a.

The secondary transfer roller 107 collectively transfers the full-color toner image conveyed by the transfer belt 105 onto the recording medium conveyed by the pair of conveying rollers 102 at the secondary transfer position.

The fixing roller 104 fixes the full-color toner image on the recording medium by heating and pressurizing the recording medium onto which the full-color toner image has been transferred.

In the case of single-sided printing, the printing device 100 sends printed material that is the recording medium on which the full-color toner image has been fixed, to the medium position detector 200. On the other hand, in the case of duplex printing, the printing device 100 sends the recording medium on which the full-color toner image has been fixed, to the sheet reverse path 106.

The sheet reverse path 106 reverses the front and back surfaces of the recording medium by switching back the fed recording medium, and conveys the recording medium in the direction of the arrow t. The recording medium conveyed through the reversing path 106 is conveyed again by the pair of conveying rollers 102, and a full-color toner image is transferred to the surface of the recording medium opposite to the previously transferred surface by the secondary transfer roller 107. The transferred full-color toner image is fixed to the surface by the fixing roller 104, and the recording medium is sent as printing material to the medium position detector 200 and to the stacker 300.

The medium position detector 200 located downstream of the printing device 100 includes a reader 201 and a position reference member 202.

The reader 201 is implemented by, for example, a CIS in which a plurality of image sensors such as complementary metal oxide semiconductors (CMOS) are arranged in line. The reader 201 receives light reflected by a reading object and outputs an image signal.

Specifically, the reader 201 reads the position (conveyance position) to which the recording medium is conveyed from the printing device 100 and the processing position (printing position) of the recording medium. Further, the reader 201 reads the position reference member 202 as an object to be read.

The CIS used in the reader 201 is typically configured to include a plurality of sensor chips 210 (see FIG. 4) in the main scanning direction, each of the sensor chips 210 including a plurality of pixels. Thus, the CIS has an effective reading length in the main scanning direction.

The position reference member 202 is a reference plate for correcting an installation position of each sensor chip 210 of the reader 201 constituted by the plurality of sensor chips 210. By correcting the installation position of each sensor chip 210 of the reader 201 using the position reference member 202 as described above, the position of the image can be detected at high accuracy.

Then, the medium position detector 200 discharges the recording medium read by the reader 201, to the stacker 300.

The stacker 300 includes a tray 301. The stacker 300 stacks the recording medium discharged by the medium position detector 200, onto the tray 301.

Next, a description is given below of the reader 201 and the position reference member 202 in the medium position detector 200.

The method, in which the outer edge position and the processing position of a conveyed object are read by the reader such as the CIS so as to correct the conveyance position and processing position of the conveyed object, might result in deterioration in accuracy.

Figure 2:
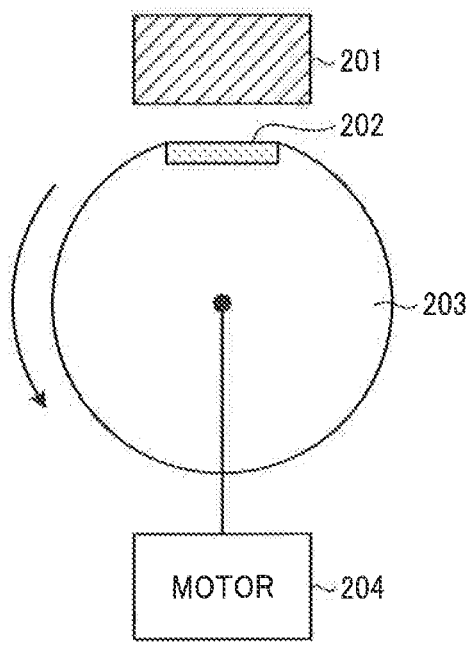
FIG. 2 is an illustration of a reading device and a position reference member of a reading device according to an embodiment of the present disclosure.

FIG. 2 is an illustration of the reader 201 and the position reference member 202 according to an embodiment of the present disclosure. As illustrated in FIG. 2, the position reference member 202 is provided on a rotator 203 that is rotationally driven by a motor 204.

That is, the position reference member 202 is moved by the rotator 203 that is rotated at a constant speed by the motor 204. The position reference member 202 moves to face the reader 201 at a predetermined timing as the rotator 203 rotates.

The position reference member 202 is rotated at a constant speed in the sub-scanning direction as described above so that the reader 201 can read a reference line X (see FIG. 4) as a reference pattern including a line extending in a predetermined direction on the position reference member 202. As a result, the inclination of the position reference member 202 in the sub-scanning direction can be detected.

In FIG. 2, the position reference member 202 is attached to the rotator 203 and the position reference member 202 is moved at a constant speed in the sub-scanning direction. However, no limitation is intended thereby.

For example, the position reference member 202 may be disposed to linearly move. In FIG. 2, the position reference member 202 is configured to move at a constant speed in the sub-scanning direction. Alternatively, the reader 201 may be moved at a constant speed in the sub-scanning direction instead.

Figure 3:
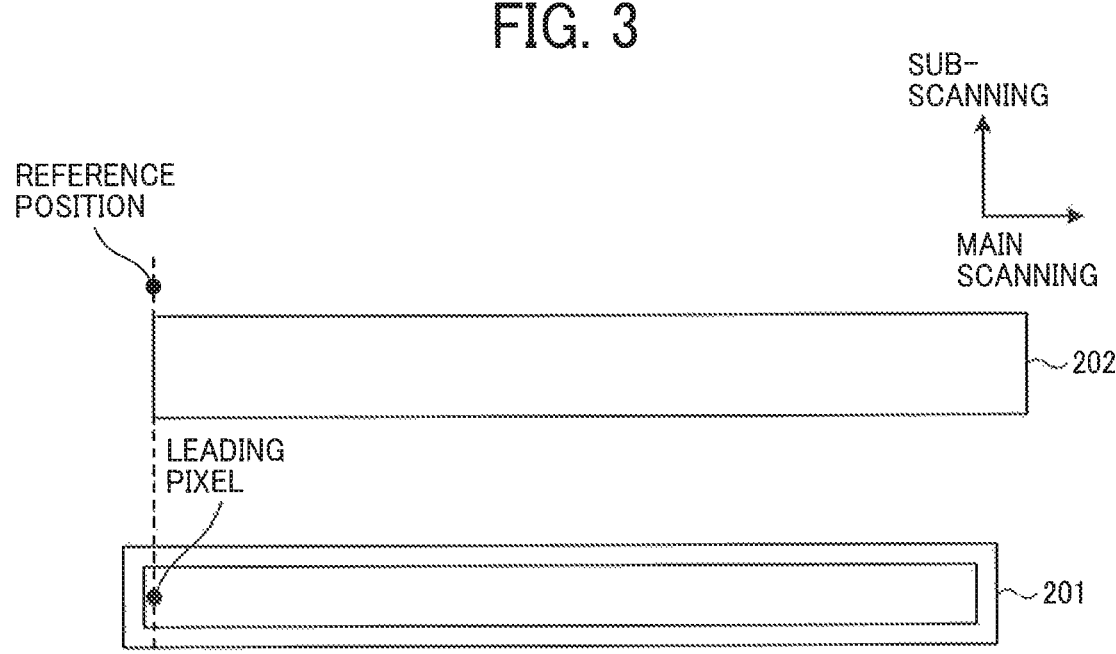
FIG. 3 is an illustration for explaining the relative positions of the reader and the position reference member in FIG. 2.

FIG. 3 is an illustration for describing the relative positions of the reader 201 and the position reference member 202. As illustrated in FIG. 3, the position reference member 202 has a reference position (support point) that corresponds to the position of a leading pixel of the image sensor at one end (leading end) of the reader 201 in the main scanning direction.

Further, the reader 201 also has a reference position (support point) that corresponds to a position of the leading pixel corresponding to the reference position of the position reference member 202.

The following describes troubles when the CIS is applied to the reader 201. Adjacent sensor chips 210 are usually disposed with a gap of a predetermined physical length (for example, one pixel) therebetween, which is known to have tolerance. The spacing between adjacent sensor chips 210 of the reader 201 varies and may no be equal between the sensor chips 210.

The spacing between adjacent sensor chips 210 of the reader 201 is also known to vary in the sub-scanning direction.

In view of such circumstances, the following configurations are proposed to improve the accuracy of detection of the positions.

Figure 4:
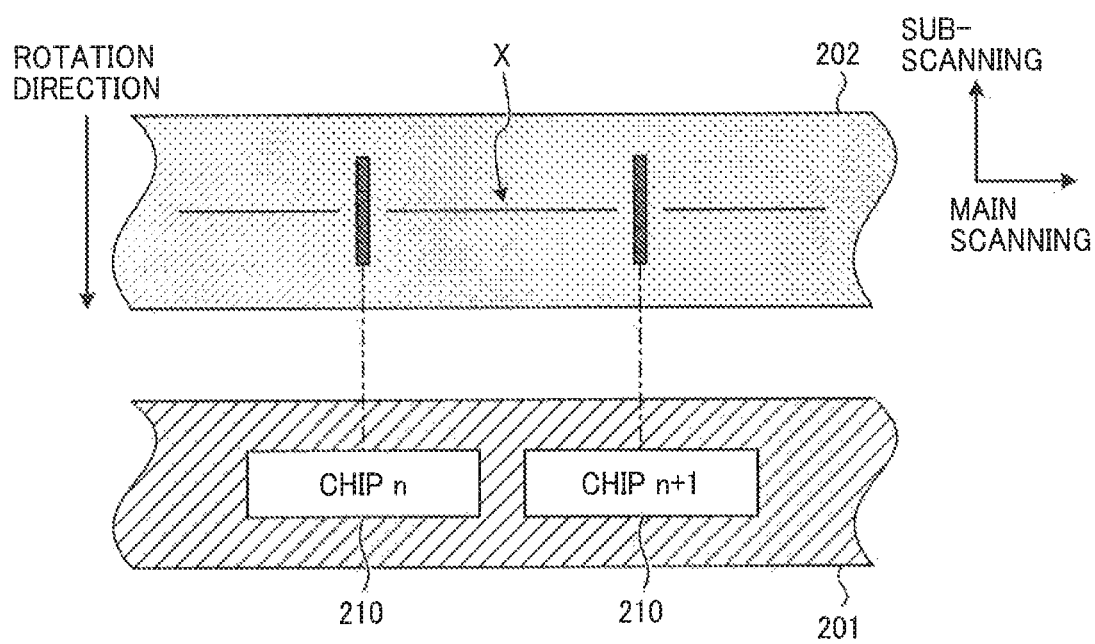
FIG. 4 is an illustration of an example of the reference line arranged on the position reference member according to an embodiment of the present disclosure.

Here, FIG. 4 is an illustration of an example of the reference line X arranged on the position reference member 202. As illustrated in FIG. 4, a prescribed reference line X is arranged on the position reference member 202.

The reference line X arranged on the position reference member 202 includes a first line (horizontal line) parallel to the main scanning direction (a predetermined direction) of the reader 201 and a second line (vertical line) extending in a direction orthogonal to the main scanning direction.

As illustrated in FIG. 4, the vertical line of the reference line X is arranged at a position corresponding to the center of each sensor chip 210 on the substrate of the reader 201.

Further, the vertical lines of the reference line X are arranged at an equal interval on the position reference member 202 to correspond to the respective sensor chips 210 on the substrate of the reader 201. Thus, each sensor chip 210 can read the vertical line.

In addition, the horizontal line of the reference line X is arranged between the vertical lines along the plurality of sensor chips 210 on the substrate of the reader 201.

As illustrated in FIG. 4, a gap is formed between the vertical line and the horizontal line on the position reference member 202. That is, the horizontal line ends at a position at which the vertical line exists so that the horizontal line is not in contact with the vertical line. With such a configuration, even if the horizontal line falls within the reading range of the reader 201, the coordinate of the vertical line can be calculated.

However, the reference line X is not limited to such a configuration, and may have a configuration in which the vertical line and the horizontal line are in contact with each other.

When the position reference member 202 expands or contracts due to any effect, e.g., the heat generation of the peripheral components, the position reference member 202 fails to function as an absolute positional reference. As a result, the accuracy of the detection of the positions might deteriorate. To avoid such a situation, the position reference member 202 according to the embodiments of the present disclosure is made of material whose linear expansion coefficient is lower than that of the substrate of the reader 201 and whose amount of expansion or contraction due to the effect of ambient temperature is negligibly small in position detection.

In the present embodiment, the position reference member 202 is made of glass in consideration of an assumed temperature variation range and linear expansion coefficient.

It should be noted that the material of the position reference member 202 is not limited to such material, and it is more preferable to use quartz glass or the like in order to detect the position of a medium at high accuracy when the temperature variation range of the reader 201 is wide.

Figure 5:
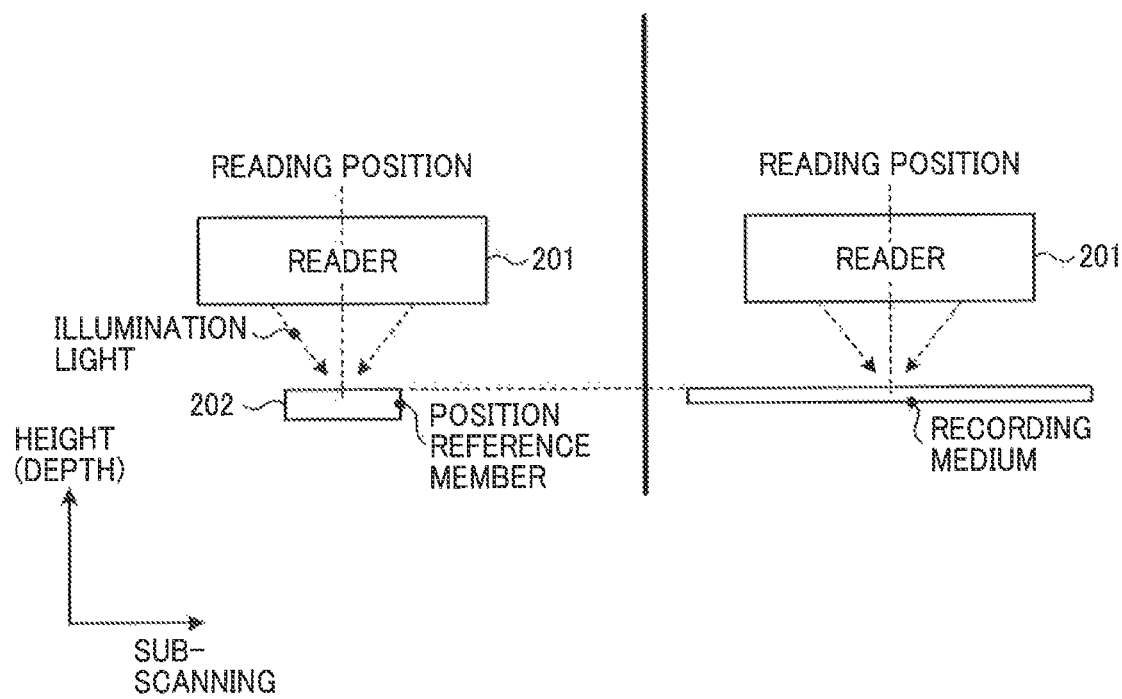
FIG. 5 is an illustration for explaining the relative positions of the position reference member and the reader according to an embodiment of the present disclosure.

FIG. 5 is an illustration for describing the relative positions of the position reference member 202 and the reader

201. The reader 201 such as CIS typically has such characteristics that image characteristics change with the height (depth) direction.

Typical examples of such image characteristics include a modulation transfer function (MTF) (depth of focus) and depth of illumination. Some types of readers 201 have characteristics that differ with the position in the main scanning direction, in addition to the height (depth) direction.

In view of such characteristics, in the present embodiment, the position reference member 202 and the reader 201 are disposed such that the depth (height) directional position at which the reader 201 reads the recording medium matches the depth (height) at which the reader 201 reads the reference line X on the position reference member 202.

With such a configuration, the effects of the changes in image characteristics can be minimized, and thus the accuracy of the detection of the positions can be improved.

Figure 6:
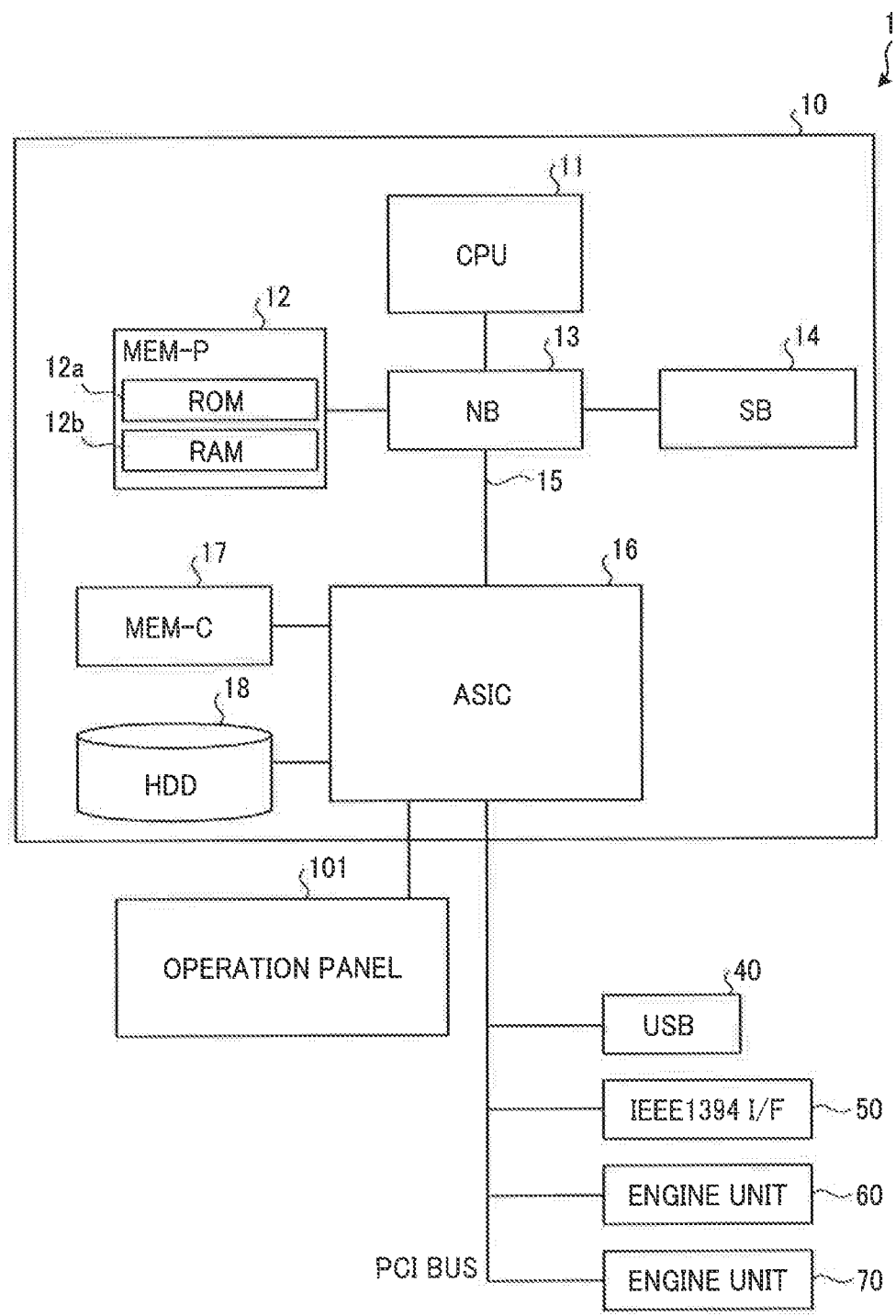
FIG. 6 is a block diagram of a hardware configuration of the printing system in FIG. 1, describing an example of electric connection of hardware elements.

FIG. 6 is a block diagram of a hardware configuration of the printing system 1, describing an example of electric connection of hardware components.

As illustrated in FIG. 6, the printing system 1 includes a controller 10 and engines 60 and 70, which are connected with each other via a peripheral component interface (PCI) bus.

The controller 10 controls entire operation of the printing system 1. In an example operation, the controller 10 controls drawing, communication, or user inputs to an operation panel 101 as an operation display unit. The engine 60 is an engine connectable to the PCI bus. Examples of the engine 60 includes a scanner engine such as the reader 201.

The engine 60 includes, in addition to the engine part, an image processing part such as error diffusion or gamma conversion. The engine 70 is an engine connectable to the PCI bus. Examples of the engine 70 includes a print engine such as a plotter including the image forming units 103Y, 103M, 103C, and 103K.

The controller 10 includes a central processing unit (CPU) 11, a north bridge (NB) 13, a system memory (MEM-P) 12, a south bridge (SB) 14, a local memory (MEM-C) 17, an Application Specific Integrated Circuit (ASIC) 16, and a hard disc drive (HDD) 18. The NB 13 and the ASIC 16 are connected through an Accelerated Graphics Port (AGP) bus 15. Further, the MEM-P 12 includes a read only memory (ROM) 12a and a random access memory (RAM) 12b.

The CPU 11 controls entire operation of the printing system 1. The CPU 11 is connected to another device via a chip set constituted by the NB 13, the MEM-P 12, and the SB 14.

The NB 13 is a bridge for connecting the CPU 11, the MEM-P 12, the SB 14, and the AGP bus 15 to one other. The NB 13 includes a memory controller to control reading and writing data to and from the MEM-P 12, a PCI master, and an AGP target.

The MEM-P 12 is a system memory used as, for example, a memory to store programs or data, a memory to deploy programs or data, and a memory to store drawing data for printing. The MEM-P 12 includes the ROM 12a and the RAM 12b.

The ROM 12a is a read only memory used as a memory to store programs or data. The RAM 12b is a read-write memory used as, for example, a memory to deploy programs or data and a memory to store drawing data for printing.

The SB 14 connects the NB 903 with a PCI device or a peripheral device. The SB 14 is connected to the NB 12 via the PCI bus. The network interface (I/F) and the like are also connected to the PCI bus.

The ASIC 16 is an integrated circuit (IC) dedicated to an image processing that includes image processing hardware elements. The ASIC 16 functions as a bridge that connects the AGP bus 15, PCI bus, HDD 18, and MEM-C 17.

The ASIC 16 includes a peripheral component interconnect (PCI) target, an accelerated graphic port (AGP) master, an arbiter (ARB) as a core of the ASIC 16, a memory controller for controlling the MEM-C 17, a plurality of direct memory access controllers (DMACs) for rotating image data with a hardware logic, and a PCI unit for transferring data between the engines 60 and 70 via the PCI bus.

The ASIC 16 is connected to a communication interface (I/F) 50, a universal serial bus (USB) 40, an institute of electrical and electronics engineers (IEEE) 1394 via the PCI bus. The operation panel 101 is directly connected to the ASIC 16.

The MEM-C 17 is a local memory used as a buffer for image data to be copied or coded. The HDD 18 is a storage for storing image data, programs, font data, and forms.

The AGP bus 15 is a bus interface for a graphics accelerator card that is proposed for enhancing the speed of graphic processing. The AGP bus 15 directly accesses the MEM-P 12 with high throughput to enhance the speed of the graphics accelerator card.

A program executed by the printing system 1 according to the above-described embodiment may be stored in any desired computer-readable storage medium such as a compact disc read-only memory (CD-ROM), a flexible disk (FD), a compact disc-recordable (CD-R), and a digital versatile disk (DVD) in an installable or executable file format, for distribution.

Further, the program executed by the printing system 1 according to the embodiments of the present disclosure may be stored on a computer connected to a network such as the Internet and downloaded via the network.

Alternatively, the program executed by the printing system 1 according to the embodiments of the present disclosure may be provided or distributed via a network such as the Internet.

Next, a description is given of functions implemented by executing program stored in the HDD 18 and the ROM 12a of the printing system 1 by the CPU 11. It should be noted that a description of known functions will be omitted here, and the unique functions exerted by the printing system 1 of the present embodiments will be described in detail.

Figure 7:
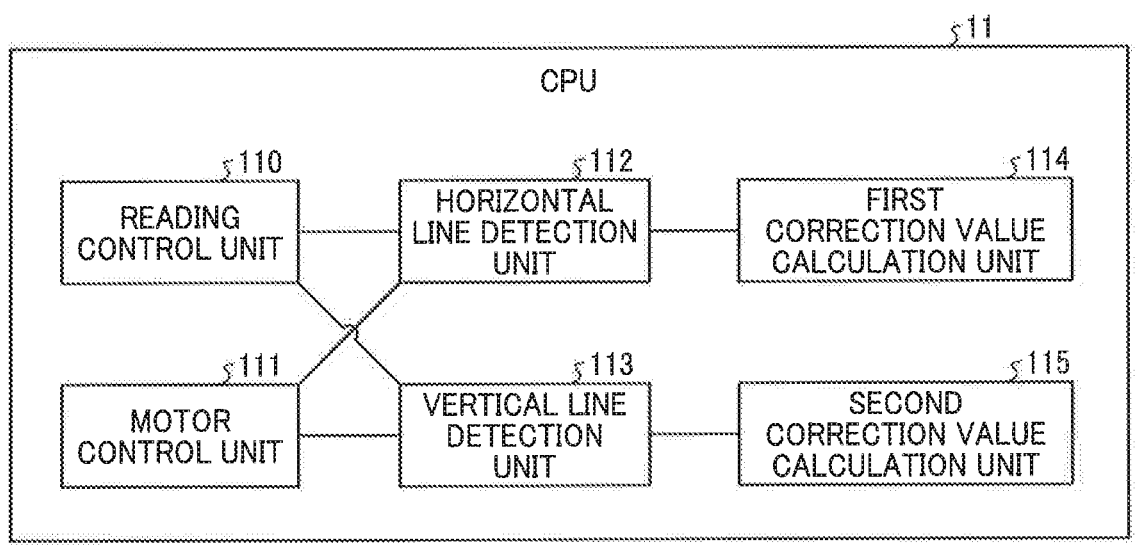
FIG. 7 is a block diagram of a functional configuration of the printing system in FIG. 1.

FIG. 7 is a block diagram of a functional configuration of the printing system 1.

As illustrated in FIG. 7, the CPU 11 of the printing system 1 functions as a reading control unit 110, a motor control unit 111, a horizontal line detection unit 112 as a position detection unit, a vertical line detection unit 113, a first correction value calculation unit 114, and a second correction value calculation unit 115.

In addition to the reading control unit 110, the motor control unit 111, the horizontal line detection unit 112, the vertical line detection unit 113, the first correction value calculation unit 114, and the second correction value calculation unit 115, the CPU 11 may further function as a moving unit to relatively move an object (recording medium) to be read in the sub-scanning direction by the reader 201.

In the present embodiment, the cases where the unique functions of the printing system 1 are implemented by executing the program by the CPU 11 are described above. Alternatively, some or all of the functions may be implemented by hardware such as a dedicated circuit.

The motor control unit 111 outputs a drive signal to the motor 204 to rotationally drive the rotator 203. In addition, the motor control unit 111 outputs a drive stop signal to the motor 204 to stop the rotation of the rotator 203.

The reading control unit 110 outputs a reading start signal to the reader 201 to start reading.

Upon receiving the reading signal from the reader 201, the reading control unit 110 outputs a reading end signal to the reader 201 to stop reading.

The horizontal line detection unit 112 causes the motor control unit 111 to move the position reference member 202 in the sub-scanning direction. Further, the horizontal line detection unit 112 reads the position reference member 202 moving in the sub-scanning direction, using the reader 201 under the control of the reading control unit 110. Then, the horizontal line detection unit 112 detects the coordinate in the sub-scanning direction of each sensor chip 210 of the reader 201.

Figure 8A:
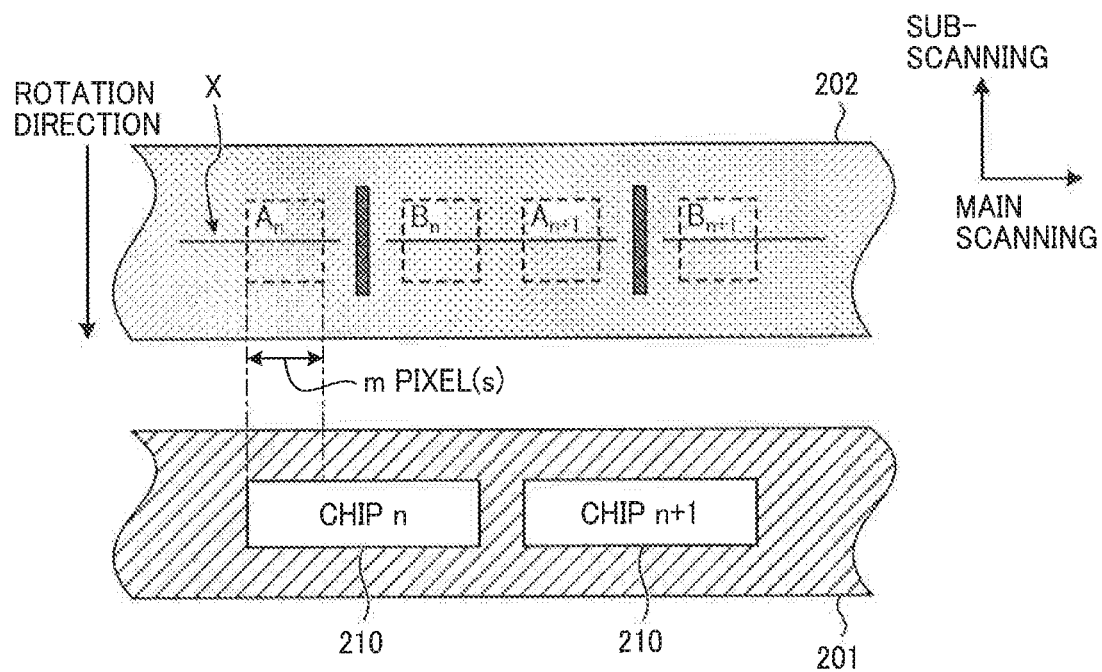
FIGS. 8A and 8B are illustrations of an example of how a coordinate in the sub-scanning direction of each sensor chip of the reader in FIG. 3 is calculated, according to an embodiment of the present disclosure.
Figure 8B:
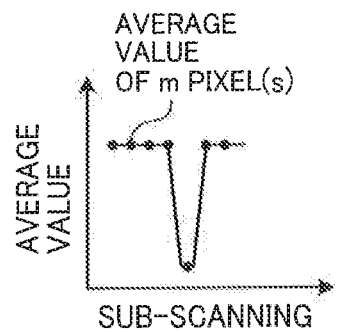

FIGS. 8A and 8B are illustrations for describing an example of how the coordinate in the sub-scanning direction of each sensor chip 210 of the reader 201 is calculated.

As illustrated in FIG. 8A, the horizontal line detection unit 112 reads horizontal lines of the position reference member 202 in regions An, An+1, . . . , An+m or regions Bn, Bn+1, . . . , Bn+m for the respective sensor chips 210 of the reader 201, so as to detect a coordinate in the sub-scanning direction of each sensor chip 210 of the reader 201.

As described above, the horizontal line X1 of the position reference member 202 is read by each sensor chip 210 at the substantially same pixel position. Such a configuration is advantageous to calculation in correction processing.

However, no limitation is intended thereby. Alternatively, the horizontal line X1 of the position reference member 202 can be read by each sensor chip 210 by changing the pixel position for each sensor chip 210.

More specifically, the horizontal line detection unit 112 reads a region A or B (with a width of m number of pixel(s)) of each sensor chip 210 of the reader 201 while rotating the position reference member 202 in the sub-scanning direction.

As illustrated in FIG. 8B, read values of m number of pixels are averaged for each line of each sensor chip 210 of the reader 201, and the averaged value data is stored in the storage unit. The horizontal line detection unit 112 detects the coordinate of each sensor chips 210 of the reader 201 from the positions of the rising edge and the falling edge of the obtained data.

After reading the horizontal line by the horizontal line detection unit 112, the vertical line detection unit 113 causes the motor control unit 111 to stop the movement of the position reference member 202 at a position where no horizontal line falls within the reading range of the reader 201.

In addition, the vertical line detection unit 113 reads the position reference member 202 in a stopped state, using the reader 201 under the control of the reading control unit 110. Then, the vertical line detection unit 113 detects the coordinate in the main scanning direction of each sensor chip 210 of the reader 201.

In the present embodiments, the vertical line detection unit 113 stops the movement of the position reference member 202 at a position where no horizontal line falls within the reading range. Alternatively, the position reference member 202 may not be stopped at a position where no horizontal line falls within the reading range of the reader 201.

Even if the position reference member 202 is stopped at the position where the horizontal line falls within the reading range, the vertical line detection unit 113 can detect a vertical line due to the gap formed between the vertical line and the horizontal line.

Figure 9:
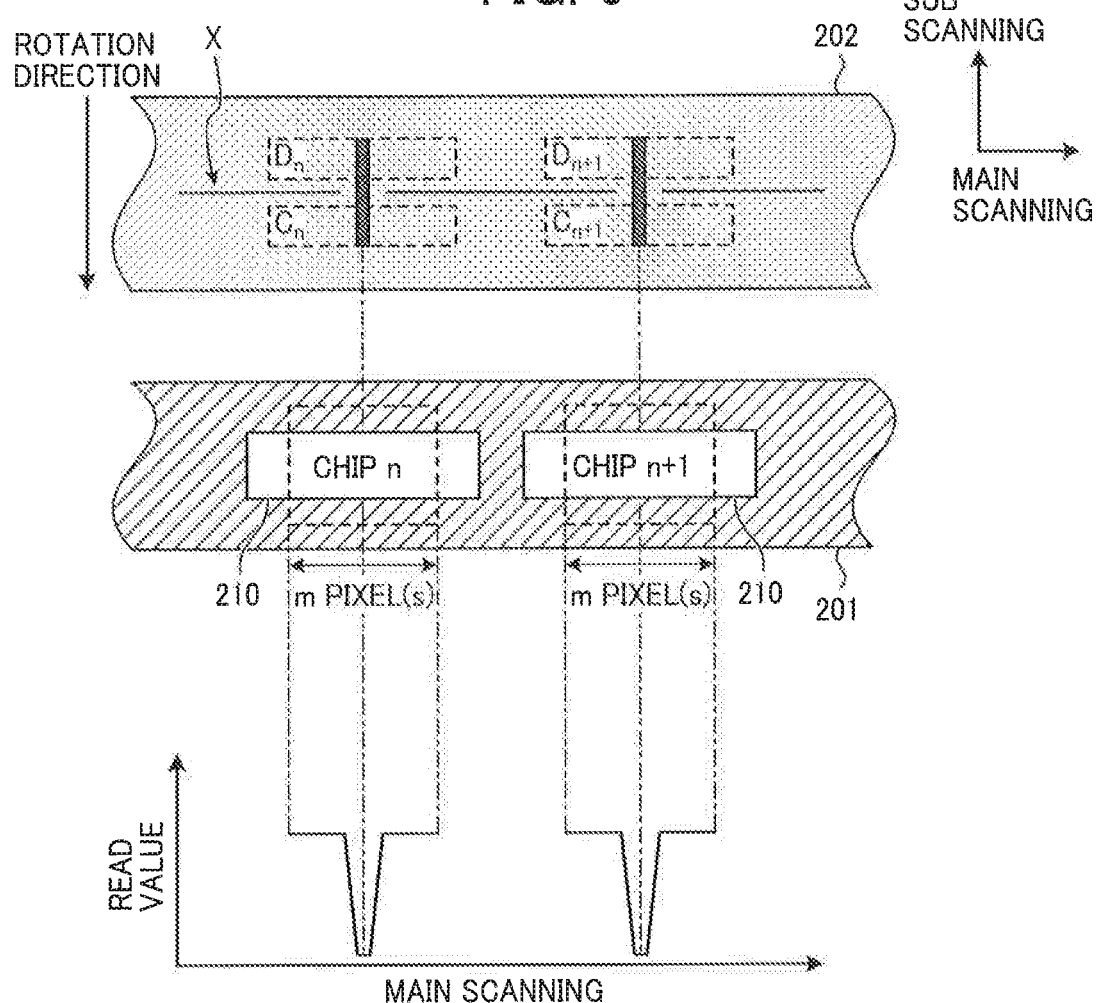
FIG. 9 is an illustration of an example of how a coordinate in the main scanning direction of each sensor chip of the reader in FIG. 3 is calculated; according to an embodiment of the present disclosure.

FIG. 9 is an illustration for an example of how a coordinate in the main scanning direction of each sensor chip 210 of the reader 201 is calculated. As illustrated in FIG. 9, the vertical line detection unit 113 reads a vertical line of the position reference member 202 in a region Cn, Cn+1, . . . , or Cn+m or Dn, Dn+1, . . . , or Dn+m for each sensor chip 210 of the reader 201, so as to detect the coordinate in the main scanning direction of each sensor chip 210 of the reader 201.

More specifically, the vertical line detection unit 113 starts reading the vertical line with the position reference member 202 stopped. At this time, the number of lines to be read by the vertical line detection unit 113 may be externally specified.

For each sensor chip 210 of the reader 201, the vertical line detection unit 113 detects the falling edge and the rising edge of data obtained by reading the position reference member 202 within the range of m number of pixels whose center is the center of each sensor chip 210 during the vertical line reading operation. Thus, the vertical line detection unit 113 detects the central coordinate of each sensor chip 210.

The vertical line may be read by the vertical line detection unit 113 before the horizontal line detection unit 112 reads the horizontal line. Alternatively, the vertical line detection may be executed after the horizontal line detection unit 112 reads the horizontal line.

In the present embodiment, the horizontal line detection unit 112 reads the horizontal line and a correction operation is performed, before the vertical line detection unit 113 starts reading the vertical line.

The first correction value calculation unit 114 corrects variations in the position in the sub-scanning direction based on the coordinate in the sub-scanning direction of each sensor chip 210 of the reader 201 detected by the horizontal line detection unit 112.

Figure 10:
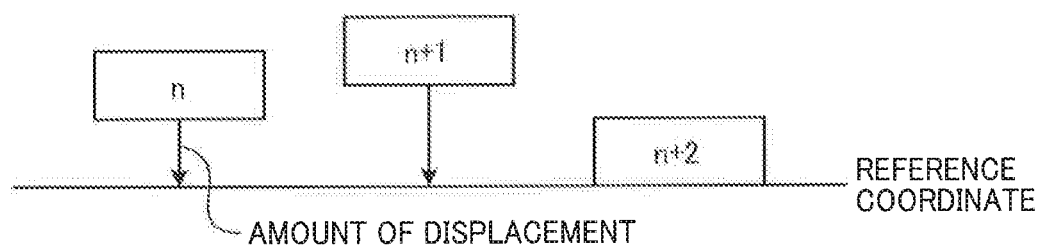
FIG. 10 is an illustration for explaining a method of generating a correction value according to an embodiment of the present disclosure.

FIG. 10 is an illustration for explaining a method of generating a correction value according to an embodiment of the present disclosure.

As illustrated in FIG. 10, the first correction value calculation unit 114 generates a first correction value based on the amount of displacement (in the sub-scanning direction) between the detected coordinate and the reference coordinate of each sensor chip 210 of the reader 201. The first correction value calculation unit 114 stores the generated first correction value in the storage unit.

The first correction value stored in the storage unit is used as a correction value in reading images.

When the falling edge or the rising edge cannot be detected for a certain sensor chip 210, or when it is determined that dust is adhered to the edge detection range in a certain sensor chip 210, the first correction value calculation unit 114 maintains the previously generated correction value as is, instead of updating the correction value of the sensor chip 210 of the reader 201.

The second correction value calculation unit 115 corrects variations in the position in the main scanning direction based on the coordinate in the main scanning direction of each sensor chip 210 of the reader 201 detected by the vertical line detection unit 113.

Specifically, the second correction value calculation unit 115 generates a second correction value based on the reference coordinate and the central coordinate of each sensor chip 210 of the reader 201 detected by the vertical line detection unit 113.

The second correction value calculation unit 115 stores the generated second correction value in the storage unit. Then, the second correction value stored in the storage unit is used as a correction value in reading an image.

When the falling edge or the rising edge cannot be detected for a certain sensor chip 210, or when it is determined that dust is adhered to the edge detection range in a certain sensor chip 210, the second correction value calculation unit 115 maintains the previously generated correction value as is, instead of updating the correction value of the sensor chip 210 of the reader 201.

Next, correction processing executed by the printing system 1 will be described.

Figure 11:
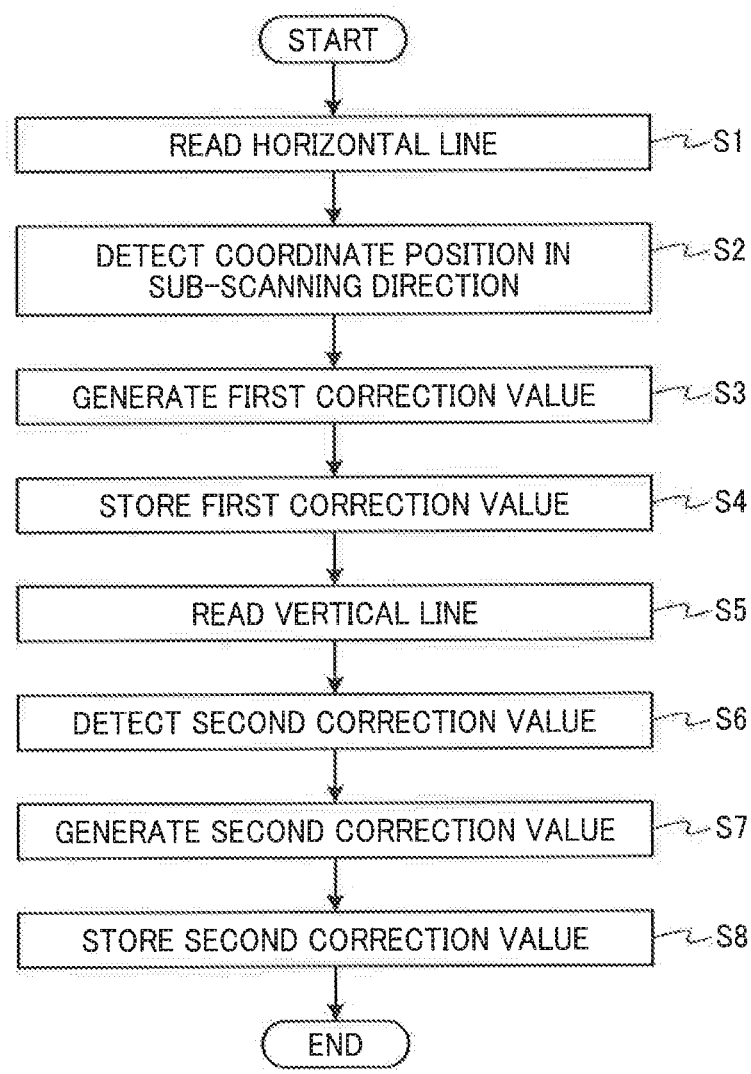
FIG. 11 is a flowchart of processes in correction processing according to an embodiment of the present disclosure.
Figure 12:
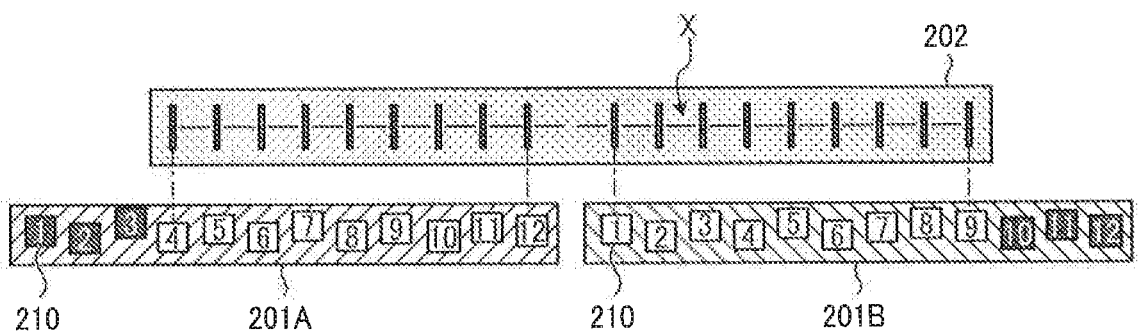
FIG. 12 is an illustration for explaining the relative positions between the reader and the position reference member according to an embodiment of the present disclosure.

FIG. 11 is a flowchart of processes in the correction processing performed by the CPU 11 according to an embodiment of the present disclosure. FIG. 12 is an illustration for explaining the relative positions between the reader 201 and the position reference member 202 according to an embodiment of the present disclosure.

As illustrated in FIG. 12, the cases where two readers 201A and 201B are arranged side by side are described. It should be noted that the sensor chips 210 that are outside the paper conveying path of the two readers 201A and 201B are masked and not subjected to the correction processing.

As to the readers 201A and 201B, the horizontal line X1 of the position reference member 202 is not required to be read by each sensor chip 210 at substantially the same pixel position. Instead, the horizontal line X1 of the position reference member 202 can be read by each sensor chip 210 by changing the pixel position for each sensor chip 210.

As illustrated in FIG. 11, upon detecting a horizontal-line reading start trigger, the horizontal line detection unit 112 starts reading the horizontal line of the position reference member 202 while moving the position reference member 202 in the sub-scanning direction (step S1).

More specifically, the horizontal line detection unit 112 causes the motor control unit 111 to move the position reference member 202 in the sub-scanning direction. Further, the horizontal line detection unit 112 reads the position reference member 202 moving in the sub-scanning direction, using the reader 201 under the control of the reading control unit 110.

When the reading operation performed by the reader 201 ends, the reader 201 outputs a reading end trigger to the horizontal line detection unit 112.

Upon receiving the reading end trigger, the horizontal line detection unit 112 stops the position reference member 202 moving in the sub-scanning direction, so that the position reference member 202 is in a standby state. Further, upon receiving the reading end trigger, the horizontal line detection unit 112 detects the coordinate in the sub-scanning direction of each sensor chip 210 of the reader 201 (step S2).

Specifically, for sensor chips 210 (4 to 12) of the reader 201A (in FIG. 12), the horizontal line detection unit 112 detects the rising edge and the falling edge for each sensor chip 210 from data obtained by averaging values of 10 pixels at the rear end of each of the sensor chips 210 (4 to 12). For sensor chips 210 (1 to 9) of the reader 201B (in FIG. 12), the horizontal line detection unit 112 detects the rising edge and the falling edge for each sensor chip 210 from data obtained by averaging values of 10 pixels at the front end of each of the sensor chips 210 (1 to 9).

Figure 13:
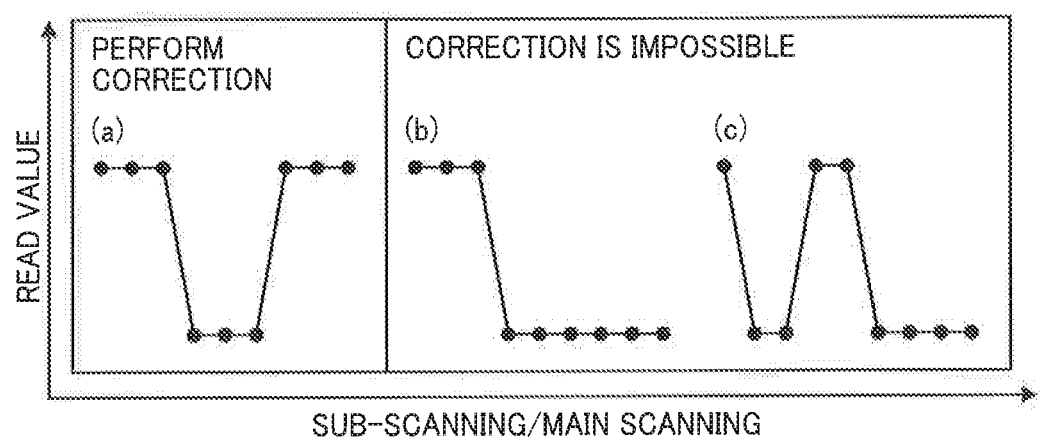
FIG. 13 is an illustration of an example of averaged data of read values according to an embodiment of the present disclosure.

FIG. 13 is an illustration of an example of data regarding averaged read values according to an embodiment of the present disclosure. When successfully detecting the falling edge and the rising edge (see (a) of FIG. 13), the horizontal line detection unit 112 detects the coordinate in the sub-scanning direction of each sensor chip 210 of the reader 201 based on the detected falling edge and rising edge.

Note that when the edge is close to the detection area and part of the data used for calculation of high (H) and low (L) is outside the detection area, the horizontal line detection unit 112 uses data of the end of the detection area so as to detect the position of the edge. Thus, the horizontal line detection unit 112 determines the coordinate of the sensor chip 210.

Then, the first correction value calculation unit 114 corrects variations in the positions in the sub-scanning direction based on the coordinate in the sub-scanning direction of each sensor chip 210 of the reader 201 detected by the horizontal line detection unit 112 (step S3).

Specifically, the first correction value calculation unit 114 uses the minimum value of the coordinates of the sensor chips 210 (4 to 8 in FIG. 12) of the reader 201A as the reference coordinate, so as to obtain the amount of displacement of each sensor chip 210 in the sub-scanning direction and thus generate a value converted into 4800 dot per inch (dpi) as a first correction value.

However, when one for each of rising edge and falling edge fails to be detected ((b) of FIG. 13), when two or more falling edges or rising edges are detected (FIG. 13 (c)), or when dust is adhered to the data extraction area of 10 pixels, the first correction value calculation unit 114 maintains the previously generated correction value as is, instead of generating a correction value of the corresponding sensor chip 210.

The first correction value calculation unit 114 stores the obtained first correction value in the storage unit (register) (step S4).

Next, as illustrated in FIG. 11, upon detecting the vertical-line reading start trigger, the vertical line detection unit 113 stops the position reference member 202 at a position where no horizontal line falls within the reading range to start reading the vertical line of the position reference member 202 (step S5).

Specifically, the vertical line detection unit 113 causes the motor control unit 111 to stop the movement of the position reference member 202 at a position where no horizontal line falls within the reading range of the reader 201. Further, the vertical line detection unit 113 reads the position reference member 202 in a stopped state, using the reader 201 under the control of the reading control unit 110. When the reading operation performed by the reader 201 ends, the reader 201 outputs a reading end trigger to the vertical line detection unit 113.

In the present embodiments, the vertical line detection unit 113 stops the movement of the position reference member 202 at a position where no horizontal line falls within the reading range. Alternatively, the position reference member 202 may not be stopped at a position where no horizontal line falls within the reading range of the reader 201.

Even if the position reference member 202 is stopped at the position where the horizontal line falls within the reading range, the vertical line detection unit 113 can detect a vertical line due to the gap formed between the vertical line and the horizontal line.

Further, upon receiving the reading end trigger, the vertical line detection unit 113 detects the coordinate in the main scanning direction of each sensor chip 210 of the reader 201 (step S6).

Specifically, the vertical line detection unit 113 detects the falling edge and the rising edge of the vertical line in the area of 50 pixels whose center is the center of each sensor chip 210 of the reader 201. Thus, the vertical line detection unit 113 detects the coordinate of the sensor chip 210.

Subsequently, the second correction value calculation unit 115 generates a second correction value to correct variations in the positions in the main scanning direction based on the coordinate in the main scanning direction of each sensor chip 210 of the reader 201 detected by the vertical line detection unit 113 (step S7).

Specifically, the second correction value calculation unit 115 generates, as the second correction value, a value by converting the coordinate in the main scanning direction of each sensor chip 210 of the reader 201 detected by the vertical line detection unit 113, into 4800 dpi.

When one for each of rising edge and falling edge fails to be detected, when two or more falling edges or rising edges are detected, or when dust is adhered to the data extraction area, the second correction value calculation unit 115 maintains the previously generated correction value instead of generating a correction value of the corresponding sensor chip 210.

The second correction value calculation unit 115 stores the obtained second correction value of the reader 201A and the second correction value of the reader 201B in the storage unit (register) (step S8).

Figure 14:
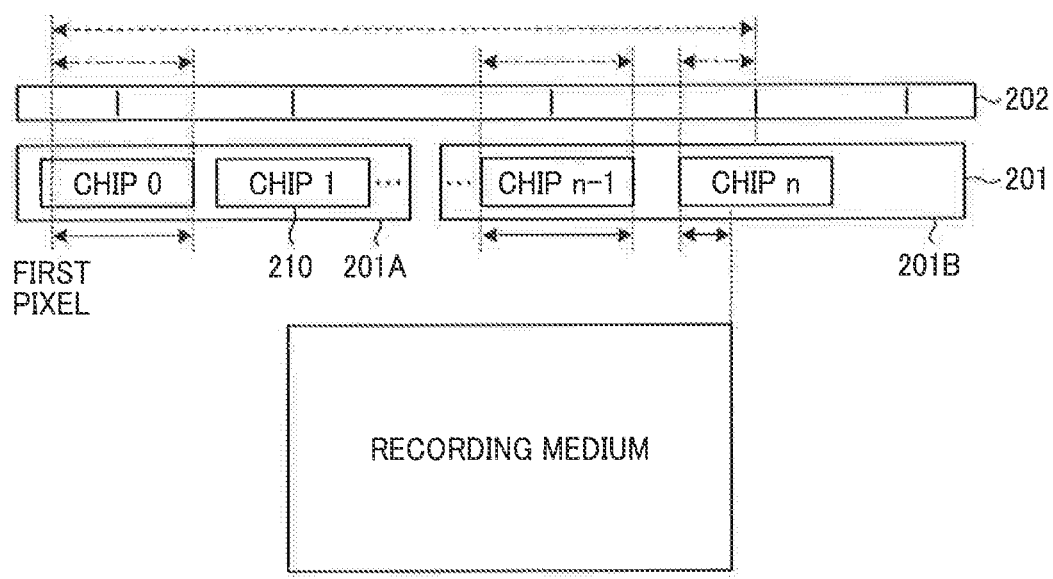
FIG. 14 is an illustration for explaining a method of calculating the coordinate in the main scanning direction performed by a second correction value calculation unit.
Figure 14:
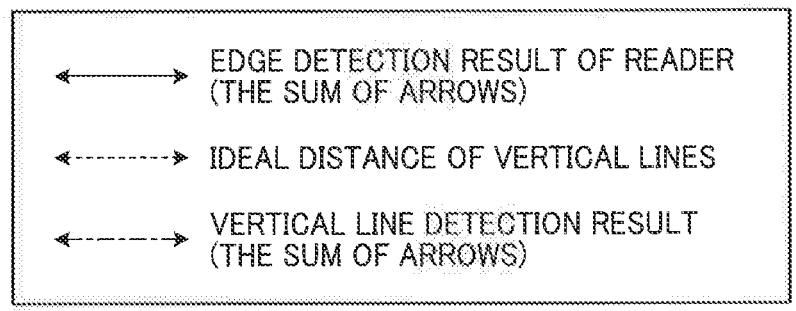

FIG. 14 is an illustration for explaining a method of calculating the coordinate in the main scanning direction performed by the second correction value calculation unit 115. As illustrated in FIG. 14, a distance between the sensor chips 210 of the reader 201 is included in the ideal distance of the vertical line in the position reference member 202.

However, the distance between the sensor chips 210 of the reader 201 is not included in the actually detected distance of the vertical line in the position reference member 202. Accordingly, a value obtained by subtracting the detected position of the vertical line from the ideal position of the vertical line ("the ideal position of the vertical line"–"the detected position of the vertical line") is added to the edge detected position, using the formula below.

$$P_{THadj}=P_{TH}+\text{ideal position of vertical line }(n)-\text{detected position of vertical line }(n)$$

where $P_{THadj}$: a detected position after correction of an edge and a mark center coordinate of the recording medium;

$P_{TH}$: a detected position of an edge and a mark center coordinate of the recording medium on the reader 201;

Ideal position of vertical line: ideal design value of the position reference member 202 in the sensor chip 210 whose edge has been detected +½ of the length of the sensor chip 210; and Detected position of vertical line: a detected coordinate of a vertical line in the sensor chip 210 whose edge has been detected.

In the above formula, since the vertical line of the position reference member 202 is arranged at the center of each sensor chip 210 on the basis of one pixel of the reader 201, ½ of the length of the sensor chip 210 is added to the ideal design value.

According to the present embodiment described above, the displacement of the installation position of the reading device can be detected at high accuracy.

Further, according to the present embodiment, by correcting the image data obtained at the time of detecting the position of the conveyed object and the image position with the correction value stored in the storage section (register), the position of the conveyed object and the image position can be detected more accurately.

Even when the reader 201 (201A and 201B) is deformed by a load from the outside, a correction value can be still generated because the vertical line and horizontal line are drawn for each sensor chip 210.

Figure 15:
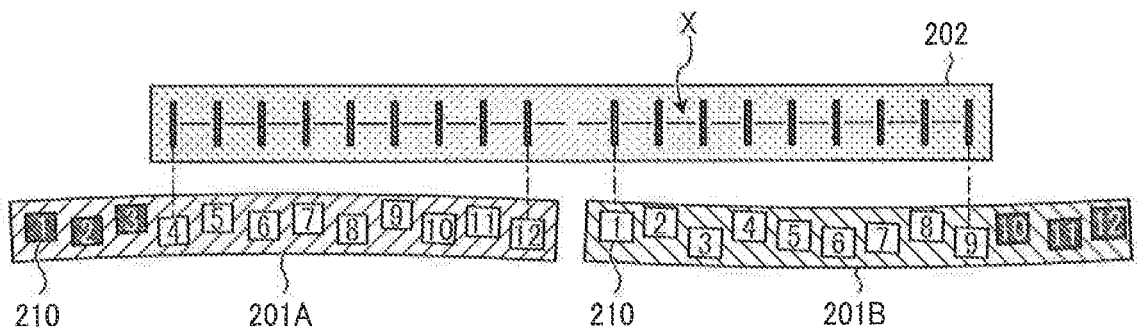
FIG. 15 is an illustration of the case where the reader is deformed.
Figure 16:
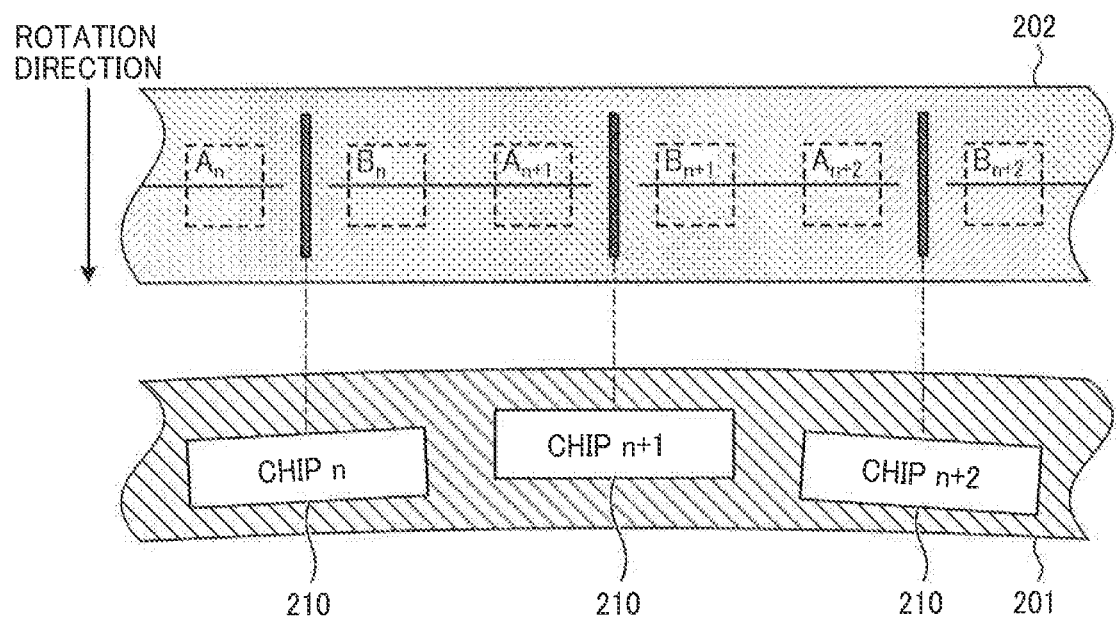
FIG. 16 is an illustration in which the deformed reader is partly enlarged.

FIG. 15 is an illustration of the case where the reader 201 is deformed. FIG. 16 is an illustration in which the deformed reader 201 is partly enlarged. As illustrated in FIGS. 15 and 16, when the deformation of the reader 201 (201A and 201B) due to the external load is large, the inclination of the sensor chip 210 also changes.

At this time, the horizontal line detection unit 112 calculates the coordinate of the a-th pixel in the area A and the coordinate of the b-th pixel in the area B and compares the detected coordinates in reading the horizontal line, so as to generate a correction value to correct the inclination of the sensor chip 210 itself.

In the present embodiment, CIS, which is an equal magnification optical system, is applied as the reader 201. However, no limitation is intended thereby.

For example, the reader 201 may be a so-called reduced optical system including a light source, a plurality of reflection members (mirrors), an imaging lens, and a linear image sensor. That is, the reader 201 may be any device capable of detecting the position of an object to be read, and the use of such a reading device can improve an accuracy of detection of positions.

In the above-described embodiments, the cases where the reading device and the image forming apparatus mounted with the reading device are applied to a printing system including an electrophotographic printing apparatus are described. Alternatively, the reading device and the image forming apparatus mounted with the reading device may be applied to a printing system including an ink-jet printing apparatus.

In the above-described embodiments, the cases where the reading device and the image forming apparatus mounted with the reading device are applied to a printing system including a printing apparatus such as a commercial printing machine (production printing machine) are described. Alternatively, the reading device and the image forming apparatus mounted with the reading device are applicable to any image forming apparatus such as a multifunction peripheral having at least two of a copy function, a printer function, a scanner function and a facsimile function, a copying machine, a printer, a scanner, and a facsimile apparatus.

Furthermore, in the above-described embodiments, the cases where the reading device is used to detect the positions in the field of forming an image are described. Alternatively, the reading device according to the present disclosure may be applied to position detection applications in various fields such as inspection in the factory automation (FA) field.

Further, the reading device according to the embodiments of the present disclosure is applicable in a bill reading apparatus that determines whether bills are printed in correct positions and shapes so as to discriminate bills and prevent forgery.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the present disclosure have been described above, the present disclosure is not limited to the embodiments described above, but a variety of modifications can naturally be made within the scope of the present disclosure. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. A reading device comprising:
a position reference member having a reference pattern that includes a line extending in a prescribed direction, the position reference member configured to relatively move in a direction orthogonal to the prescribed direction; and
a reader including a plurality of sensor chips arranged in the prescribed direction, each of the sensor chips including a plurality of pixels,
the reference pattern corresponding to each of the sensor chips of the reader,
wherein the reference pattern includes a horizontal line extending in the prescribed direction, and a vertical line extending in the direction orthogonal to the prescribed direction, and
wherein the reader is configured to read the vertical line after reading the horizontal line.

2. The reading device according to claim 1,
wherein the position reference member is configured to move in a direction orthogonal to the prescribed direction, relative to the reader.

3. The reading device according to claim 1,
wherein the horizontal line is in contact with the vertical line at a position at which the vertical line exists.

4. The reading device according to claim 1,
wherein the reader is configured to:
read the horizontal line from the position reference member that relatively moves in the direction orthogonal to the prescribed direction; and
read the vertical line from the position reference member that is stopped at a position at which the horizontal line is out of a reading range of the reader.

5. The reading device according to claim 4, further comprising circuitry configured to:
detect a coordinate of each sensor chip based on the horizontal line read by the reader, the coordinate being detected in the direction orthogonal to the prescribed direction;
generate a first correction value based on an amount of displacement of the coordinate of each sensor chip, from a first reference coordinate;
detect a central coordinate in the prescribed direction of each sensor chip based on the vertical line read by the reader; and
generate a second correction value based on the detected central coordinate and a second reference coordinate.

6. The reading device according to claim 1,
wherein the horizontal line ends at a position at which the vertical line exists, and the horizontal line is not in contact with the vertical line.

7. The reading device according to claim 1, further comprising circuitry configured to relatively move an object to be read by the reader, in the direction orthogonal to the prescribed direction.

8. An image forming apparatus comprising:
the reading device according to claim 1;
a print engine; and
circuitry configured to:
relatively move a recording medium, onto which an image is to be formed by the print engine, in the direction orthogonal to the prescribed direction in which the line of the reference pattern extends;
detect an outer shape of the recording medium and a position of an image pattern on the recording medium based on the image read by the reader; and
correct a detection result with reference to a correction value obtained by the reading device.

9. The reading device according to claim 1, further comprising circuitry configured to:
detect a coordinate of each sensor chip based on the horizontal line read by the reader, the coordinate being detected in the direction orthogonal to the prescribed direction;
generate a first correction value based on an amount of displacement of the coordinate of each sensor chip, from a first reference coordinate;
detect a central coordinate in the prescribed direction of each sensor chip based on the vertial line read by the reader; and
generate a second correction value based on the detected central coordinate and a second reference coordinate,
wherein the horizontal line ends at a position at which the vertical line exists, and the horizontal line is not in contact with the vertical line.

10. The reading device according to claim 9,
wherein the circuitry is further configured to, in response to a failure in detecting a falling edge or rising edge for a sensor chip, maintain a previously generated correction value for the sensor chip.

11. The reading device according to claim 1,
wherein a distance between the reader and the position reference member matches a distance between the reader and a recording medium.

12. The reading device according to claim 11,
wherein the position reference member is disposed downstream from a fixing roller.

13. A reference pattern reading method comprising:
reading, by a reader, a line extending in a prescribed direction in a reference pattern, from a position reference member that relatively moves in a direction orthogonal to the prescribed direction, the position reference member including the reference pattern that corresponds to each of sensor chips disposed in the prescribed direction on the reader, each of the sensor chips including a plurality of pixels; and
after reading the line, reading another line extending in a direction orthogonal to the prescribed direction in the reference pattern, from the position reference member stopped at a position at which the line extending in the prescribed direction falls within a reading range of the reader.

14. A non-transitory recording medium storing a program for causing a computer to execute the method according to claim 13.

15. A reading device comprising:
a position reference member having a reference pattern that includes a line extending in a prescribed direction, the position reference member configured to relatively move in a direction orthogonal to the prescribed direction; and a reader including a plurality of sensor chips arranged in the prescribed direction, each of the sensor chips including a plurality of pixels, the reference pattern corresponding to each of the sensor chips of the reader, wherein the reference pattern includes a horizontal line extending in the prescribed direction, and a vertical line extending in the direction orthogonal to the prescribed direction, wherein the reading device further includes circuitry configured to relatively move an object to be read by the reader, in the direction orthogonal to the prescribed direction, and wherein the reader is configured to read the vertical line after reading the horizontal line.

16. The reading device according to claim 15, further comprising circuitry configured to:

detect a coordinate of each sensor chip based on the horizontal line read by the reader, the coordinate being detected in the direction orghogonal to the prescribed direction;

generate a first correction value based on an amount of displacement of the coordinate of each sensor chip, from a first reference coordinate;

detect a central coordinate in the prescribed direction of each sensor chip based on the vertical line read by the reader; and generate a second correction value based on the detected central coordinate and a second reference coordinate, wherein the horizontal line ends at a position at which the vertical line exists, and the horizontal line is not in contact with the vertical line.

17. The reading device according to claim 16, wherein the circuitry is further configured to, in response to a failure in detecting a falling edge or rising edge for a sensor chip, maintain a previously generated correction value for the sensor chip.

18. The reading device according to claim 15, wherein the position reference member is disposed downstream from a fixing roller.

19. The reading device according to claim 15, wherein a distance between the reader and the position reference member matches a distance between the reader and a recording medium.

* * * * *